Oct. 26, 1948.  K. SCHATZ  2,452,328
FOOD CUTTING UTENSIL
Filed Jan. 9, 1946  4 Sheets-Sheet 4

INVENTOR.
Karl Schatz
BY

UNITED STATES PATENT OFFICE 2,452,328

FOOD CUTTING UTENSIL

Karl Schatz, Peekskill, N. Y.

Application January 9, 1946, Serial No. 639,939

9 Claims. (Cl. 146—169)

My present invention relates to food cutting utensils.

It is an object of my present invention to provide food cutting utensils, particularly cutting devices for cutting onions, which are constructed so as to eliminate the necessity of holding the food during cutting with the hand.

It is another object of my present invention to provide food cutting utensils by which it is possible to obtain the cut food cleanly sliced, the single slices neatly superimposed upon each other.

It is a further object of my present invention to provide food cutting utensils which are semi-automatic, i. e. provided with means for automatically guiding the food to be cut past the cutting blade.

Still a further object of my present invention consists in food cutting devices provided with means permanently pressing the food to be cut against the supporting plate holding the cutting blade.

With the above objects in view, my present invention mainly consists of a food cutting utensil comprising in combination a base, a flat body member mounted on this base and provided with a flat face and a slot in this face, a cutting blade mounted in this slot, a food holder for holding the food during cutting, first pivot means turnably securing this food holder to the mentioned body member so that the food holder is adapted to move to and fro in a turning plane which is parallel to and at a slight distance from the flat face of the mentioned body member, a food holding member forming part of this food holder, and second pivot means forming also part of this food holder and constructed and arranged so as to enable tilting of the food holding member about an axis which is parallel to the turning plane of the food holder, thus enabling tilting of the food holding member away from the flat face of the body member and insertion of the food into this food holding member.

In accordance with a preferred embodiment of my present invention, I provide in combination with a food cutting utensil of the above described type additional means which facilitate the operation:

Thus, first of all, it is advisable to provide spring means which tend to turn the food holder about the mentioned first pivot means in one direction so that it is only necessary to turn the food holder during actual cutting in the other direction, while it is moved back into its initial position by action of these spring means.

Furthermore, it is advisable to provide manually operable locking means which make it possible to lock the turnable food holding member, after inserting of the food to be cut, in operative position adjacent to the flat face of the above mentioned body member.

In order to properly position the food during cutting, it is advisable to provide a pressing member and spring means, both forming part of the food holder member mentioned above; this pressing member is arranged within the food holding member movably normal to the flat face of the body member and the spring means are arranged between the food holding member and the pressing member tending to move the latter toward the flat face of the body member when the food holder is in operative cutting position.

In order to prevent the spring means mentioned in the preceding paragraph to permanently force the pressing member toward the flat face of the body member and thus to prevent proper positioning of the food to be cut within the food holding member, it is advisable to provide manually releasable blocking means adapted to hold the pressing member moved away from the flat face of the body member against action of the spring means mentioned above.

In accordance with my present invention, a preferred embodiment of the same comprises a vertical supporting plate provided with a vertical flat face and a vertical slot in this face; furthermore, this preferred embodiment of my invention is provided with a vertical or slightly inclined cutting blade mounted in the mentioned vertical slot of the vertical supporting plate and the pivot means securing the food holder to the supporting plate are constructed so as to enable turning of this food holder about a horizontal axis.

I have found it advisable to combine with a food cutting utensil of the above described type a receiving plate mounted turnably adjacent to the cutting blade; this turnable receiving plate is provided and cooperates with motion transmitting means operated by the turnable food holder mentioned above in such a manner that said turnable receiving plate is turned against the cutting blade each time the turnable food holder is moved along this cutting blade. By provision of such a turnable receiving plate and operation of the same by and during operation of the turnable food holder, it is possible to obtain on the receiving plate cleanly cut slices of the food after cutting of the same.

The novel features which I consider as characteristic for my invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
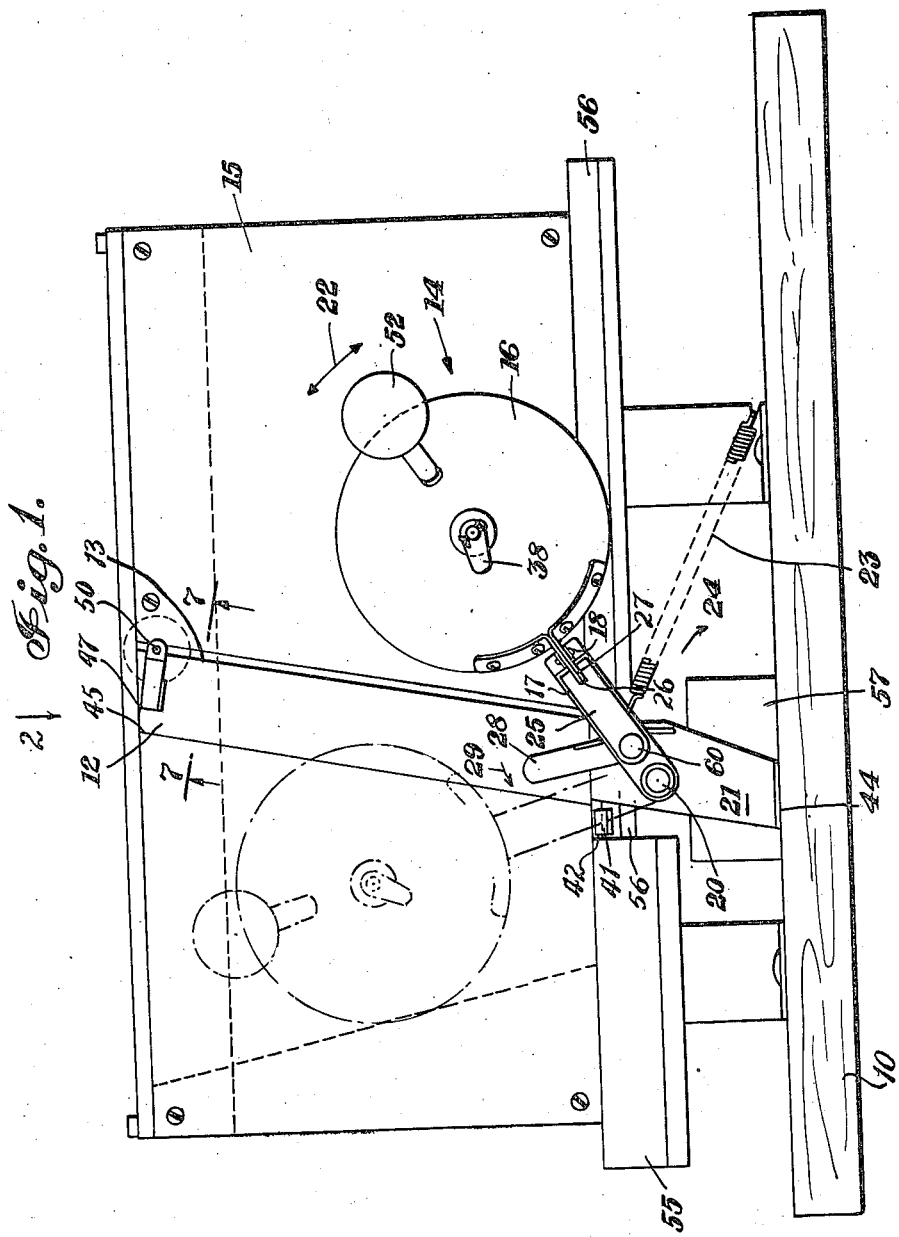
Fig. 1 is a front view of my new food cutting utensil, seen in direction of arrow 1 in Fig. 2.

As shown in the drawings, particularly in Figs. 1, 2, 3 and 6, my new food cutting utensil is mounted on a base board 10 and its main elements are a vertical supporting plate 11 secured by means of brackets to board 10, a cutting plate 12 adjustably mounted in slot 13 provided in the supporting plate 11, and the turnable food holder 14 adapted to move the food to be cut past cutting blade 12 as described farther below in detail.

Figure 2:
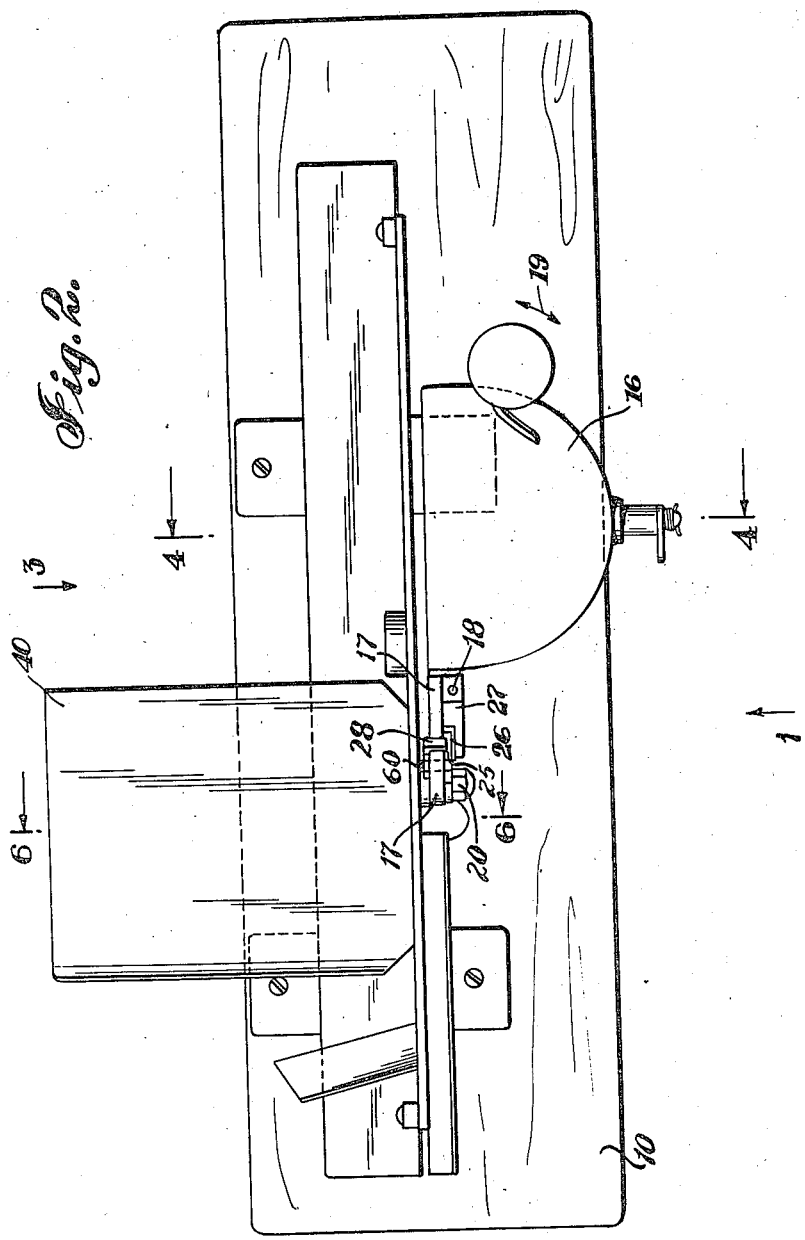
Fig. 2 is a top view of my new food cutting utensil shown in Fig. 1, seen in direction of arrow 2 of Fig. 1.

This supporting plate 11 is stationary and its front face 15 serves for guiding the food to be cut during the cutting process. The turnable food holder 14 mentioned above consists of a food holding member 16 which will be described below in detail, and a supporting arm 17 to which the food holding member 16 is pivoted by means of pivoting means 18 tiltably to and fro in direction of arrow 19 as indicated in Fig. 2. The pivoting arm 17 in turn is turnably secured by means of pivot 20 to bracket 21, which latter is firmly secured to supporting plate 11 at the bottom thereof. This pivot 20 enables turning of the pivoting arm 17 together with food holding member 16 in direction of arrow 22 in a vertical plane which is parallel to the vertical supporting plate 11 and its front face 15. Spring 23 secured at its one end to base 10 and at its other end to the pivoting arm 17 permanently tends to turn this pivoting arm together with the food holding member 16 pivoted thereto in direction of arrow 24.

In order to hold the food holding member 16 in its operative position shown in Fig. 2 in full lines, I provide the locking arm 25 pivoted by means of pivot 60 to the pivoting arm 17; this locking arm is adapted to engage, as clearly shown in Fig. 2; a slot 26 provided in the lever arm 27 secured to the food holding member 16.

The pivot 60 carries also the small operating lever 28; thus, turning of this lever 28 in direction of arrow 29 results in turning of pivot 60 and the locking arm 25 in the same direction; such turning movement of arm 25 causes sliding of this arm out of the slot 26 in arm 27, thereby freeing this arm 27 and the food holding member 16 to which this arm is firmly secured to turn in direction of arrow 19, as indicated in Fig. 2.

Figure 4:
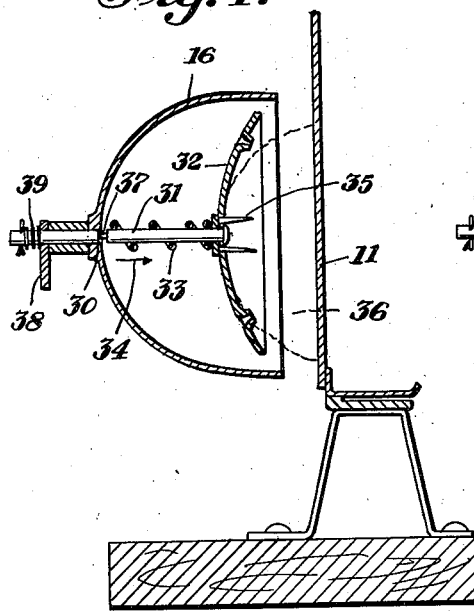
Fig. 4 is a cross section through the food holding member of my new food cutting utensil shown in Figs. 1 to 3, along line 4—4 of Fig. 2, in operative position.
Figure 5:
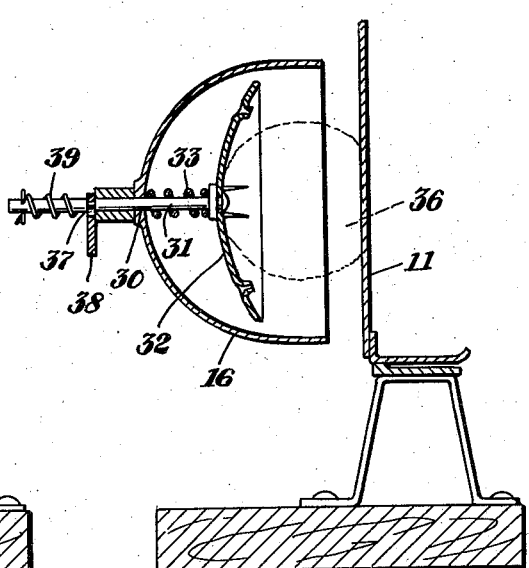
Fig. 5 is a cross section through the food holding member of my new food cutting utensil, similar to the cross section shown in Fig. 4, but showing the food holding member in inoperative position.

The food holding member 16 mentioned above is provided at its top with an opening 30 through which the rod 31 carrying at its end the pressing member 32 passes in the way shown in Figs. 4 and 5. Spring 33 arranged around rod 31 forces the pressing member 32 in direction of arrow 34 toward the supporting plate 11.

The pressing member 32 is preferably provided with projecting pins 35 adapted to enter the food, e. g. onion 36, shown in dotted lines and to firmly hold the same.

It is evident that a device of this type is adapted to press the food, e. g. onion 36, during cutting strongly against the flat face 15 of supporting plate 11. However, insertion of the food to be cut into a holding member of this type is rather difficult since the pressing member 32 is permanently in operative position shown in Fig. 4, and thus, during insertion of the food the force of spring 33 has to be overcome. In order to avoid this difficulty, I provide blocking means adapted to hold the spring 33 during insertion of the food in inoperative position as shown in Fig. 5; after insertion of the food, the spring is released and forces the pressing member 32 into operative position shown in Fig. 4. In the embodiment shown in Figs. 4 and 5, these blocking means consist of a circular groove 37 provided in rod 31 and a small blocking plate 38 provided with a hole 39 which is slightly larger than the diameter of the rod 31.

These blocking means operate as follows: If it is desired to insert the food to be cut, e. g. onion 36, into the food holder, the pressing member 32 is pressed backward against direction of arrow 34 until it reaches the position shown in Fig. 5. In this position, one edge portion of blocking plate 38 engages, as clearly shown in Fig. 5, the groove 37 and prevents sliding of rod 31 and pressing member 32 secured thereto in direction of arrow 34. After insertion of the food, the blocking plate 38 is slightly moved so that its edge moves out of groove 37 thereby releasing rod 31 which together with pressing member 32 will then be moved by spring 33 in direction of arrow 34 into the position shown in Fig. 4.

Figure 3:
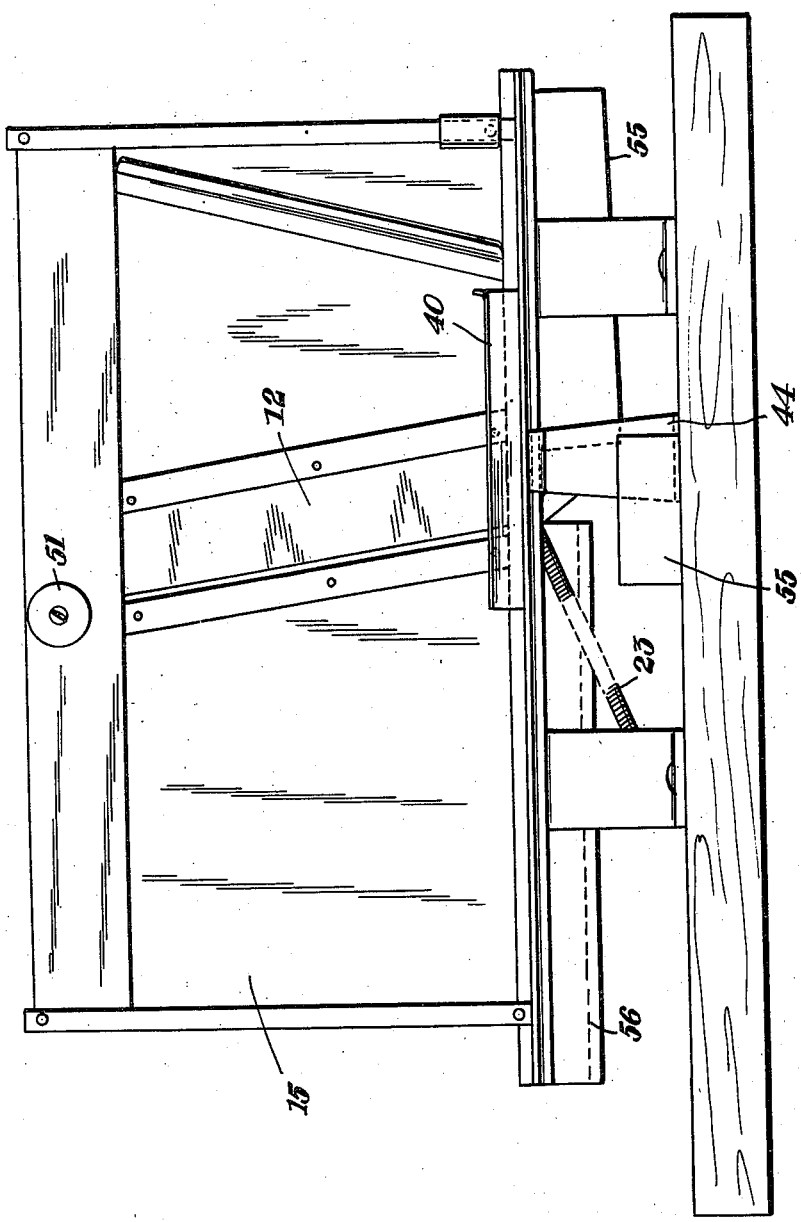
Fig. 3 is a rear view of the food cutting utensil shown in Figs. 1 and 2, seen in direction of arrow 3 of Fig. 2.
Figure 6:
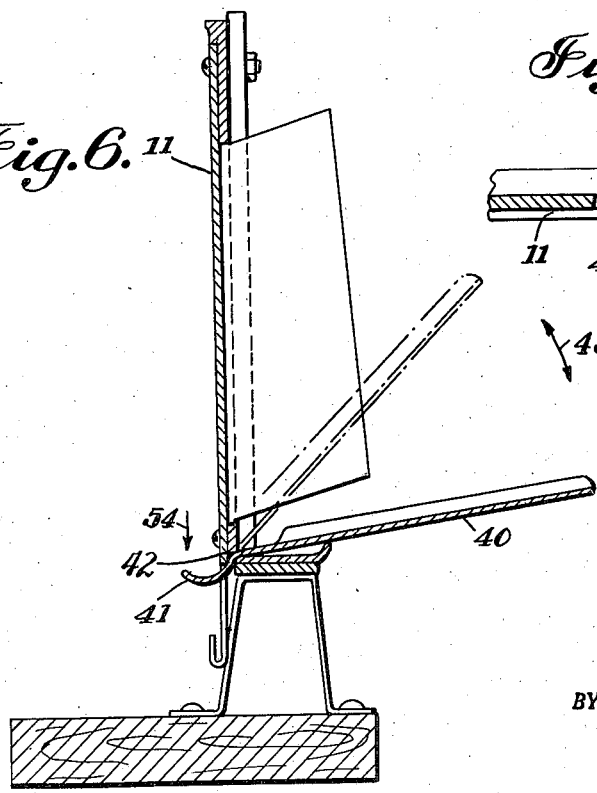
Fig. 6 is a cross section through my new food cutting utensil shown in Figs. 1 to 3, along line 6—6 of Fig. 2.

As explained above, I provide in combination with my new food cutting utensil as part thereof, a turnable receiving plate 40 which is arranged, as clearly shown in Figs. 2, 3 and 6, on the rear face of the supporting plate 11. This receiving plate 40 is provided with a projection 41 passing through a slot 42 at the bottom of the supporting plate 11 and reaching into the path of the operating lever 28. This slot 42 serves actually also as a pivot about which the receiving plate can turn in direction of arrow 43, as indicated in Fig. 6.

Figure 7:
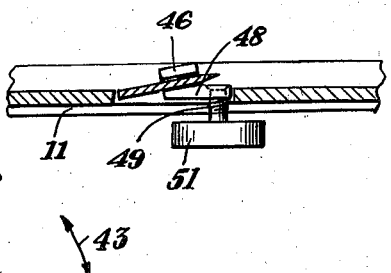
Fig. 7 is a partial longitudinal section through the cutting blade and the means for adjusting the same, along line 7—7 of Fig. 1.

I wish to state that it is advisable to arrange the cutting blade 12 turnably about its pivots 44 and 45 and to provide means for adjusting the position of this blade so as to regulate the thickness of the cut food slices. Adjusting means which I have found particularly advantageous are shown in Fig. 7. They consist of a channel shaped guide 46 reaching over the upper edge 47 of blade 12. This channel shaped guide 46 is freely turnably secured at 48 to the tip of screw 49 which in turn is screwed through a screw threaded hole 50 in the supporting plate 11. This screw 49 carries at its end firmly secured thereto the adjusting knob 51.

My new food slicing utensil is operated as follows:

First of all, the thickness of the cut food slices is adjusted by turning the adjusting knob 51. It is evident that turning of this knob 51 in clockwise direction will result in increase of the thickness of the food slices and turning of this knob in counter-clockwise direction will decrease the thickness of the cut food slices.

Then the operating lever 28 is turned in direction of arrow 29 enabling turning of the food holding member 16 together with the pressing member 32 into the position shown in Fig. 2 in dotted lines.

Thereafter, the pressing member 32 is pressed, as explained above, into the position shown in Fig. 5, and held in this position by blocking plate 38.

After these preparatory steps, the food cutting utensil is ready for insertion of the food to be cut. This food is inserted as shown in Fig. 5.

The food holding member 16, together with the pressing member 32 which is still in the position shown in Fig. 5, are turned from the position shown in Fig. 2 in dotted lines into the position shown in full lines, i. e. into operative cutting position and locked in this position by turning the operating lever 28 against direction of arrow 29 moving thereby the locking arm into slot 26 of arm 27 secured to the food holding member 16.

Thereafter, the blocking plate 38 is slightly moved, releasing rod 31; thereby the pressing member 32 together with the food held by it is pressed by means of spring 33 against face 15 of supporting plate 11.

In order to slice the food, it is now only necessary to move the food holder 16 holding it at knob 52 from its position shown in Fig. 1 in full lines into the position shown in dotted lines; from this latter position the food holder is automatically turned back into its initial position shown in full lines by means of spring 23, as described above in detail.

It is evident that during movement of the food holder and the food held by it from their initial position shown in full lines into their final position shown in dotted lines, a slice will be cut from the food surface contacting face 15 of the supporting plate 11.

The cut slice will pass through slot 13 adjacent to plate 12 and drop onto the receiving plate 40. This receiving plate 40, however, will at the time when the slice passes through slot 13 not be in the position shown in Fig. 6 in full lines, but in the position shown in this figure in dotted lines. This is due to the fact that during turning of the food holding member 16 from its initial position shown in full lines into the position shown in dotted lines, the operating lever 28 will hit projection 41 of the receiving plate 40 and press the same downward in direction of arrow 54, as indicated in dotted lines in Fig. 6. This will result in tilting of the receiving plate 40 from its position shown in this figure in full lines into the position shown in dotted lines; in this latter position the receiving plate is relatively near to slot 13 and thus the cut slice passing through this slot will be neatly deposited on the tilted receiving plate 40 instead of simply dropping upon the same.

Thereafter the cut slice is removed from the receiving plate; however, it is also possible to leave the cut slices on the receiving plate and to remove them after the entire food is cut.

The cutting operation can be continued without interruption until the entire food held by the food holder is cut. No adjustment of the food during cutting is necessary.

I wish to state that I might combine with a cutting utensil of the above described type various accessories:

Thus, for instance, it is advisable to attach to the bottom of the supporting plate 11 inclined guiding members 55 and 56 for guiding the juices free during cutting into the container 57 which can be removed together with these juices whenever required.

It will be understood that each of the elements described above, or two or more together, may also find a useful application in other types of food cutting utensils differing from the types described above.

While I have illustrated and described the invention as embodied in food cutting utensils provided with turnable holding means, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What I claim as new and desire to secure by Letters Patent is:

1. In a food cutting utensil in combination a base; a body member mounted on said base and provided with a flat face and a slot in said face; a cutting blade mounted in said slot; a food holder for holding the food during cutting; first pivot means turnably securing said food holder to said body member so that said food holder is adapted to move to and fro in a turning plane being parallel to and at a slight distance from said flat face of said body member; a food holding member forming part of said food holder; second pivot means forming also part of said food holder and constructed and arranged so as to enable tilting of said food holding member about an axis being parallel to said turning plane of said food holder, thus enabling tilting of said food holding member away from said flat face of said body member; a pressing member forming also part of said food holder and arranged within said food holding member movably normal to said turning plane of said food holder when the same is in operative cutting position; and spring means forming also part of said food holder and arranged between said food holding member and said pressing member tending to move the latter toward said flat face of said body member when said food holder is in operative cutting position.

2. In a food cutting utensil in combination a base; a body member mounted on said base and provided with a flat face and a slot in said face; a cutting blade mounted in said slot; a food holder for holding the food during cutting; first pivot means turnably securing said food holder to said body member so that said food holder is adapted to move to and fro in a turning plane being parallel to and at a slight distance from said flat face of said body member; first spring means tending to turn said food holder about said first pivot means in one direction; a food holding member forming part of said food holder; second pivot means forming also part of said food holder and constructed and arranged so as to enable tilting of said food holding member about an axis being parallel to said turning plane of said food holder, thus enabling tilting of said food holding member away from said flat face of said body member; a pressing member forming also part of said food holder and arranged within said food holding member movably normal to said turning plane of said food holder when the same is in operative cutting position; and second spring means also forming part of said food holder and arranged between said food holding member and said pressing member tending to move the latter toward said flat face of said body member when said food holder is in operative cutting position.

3. In a food cutting utensil in combination a base; a body member mounted on said base and provided with a flat face and slot in said face; a cutting blade mounted in said slot; a food holder for holding the food during cutting; first pivot means turnably securing said food holder to said body member so that said food holder is adapted to move to and fro in a turning plane being parallel to and at a slight distance from said flat face of said body member; a food holding member forming part of said food holder; second pivot means forming also part of said food holder and constructed and arranged so as to enable tilting of said food holding member about an axis being parallel to said turning plane of said food holder, thus enabling tilting of said food holding member away from said flat face of said body member; a pressing member forming also part of said food holder and arranged within said food holding member movably normal to said turning plane of said food holder when the same is in operative cutting position; spring means forming also part of said food holder and arranged between said food holding member and said pressing member tending to move the latter toward said flat face of said body member when said food holder is in operative cutting position; and manually operable locking means enabling locking of said food holding member together with said pressing member in operative cutting position adjacent to said flat face of said body member, whenever desired.

4. In a food cutting utensil in combination a base; a body member mounted on said base and provided with a flat face and a slot in said face; a cutting blade mounted in said slot; a food holder for holding the food during cutting; first pivot means turnably securing said food holder to said body member so that said food holder is adapted to move to and fro in a turning plane being parallel to and at a slight distance from said flat face of said body member; first spring means tending to turn said food holder about said first pivot means in one direction; a food holding member forming part of said food holder; second pivot means forming also part of said food holder and constructed and arranged so as to enable tilting of said food holding member about an axis being parallel to said turning plane of said food holder, thus enabling tilting of said food holding member away from said flat face of said body member; a pressing member forming also part of said food holder and arranged within said food holding member movably normal to said turning plane of said food holder when the same is in operative cutting position; second spring means also forming part of said food holder and arranged between said food holding member and said pressing member tending to move the latter toward said flat face of said body member when said food holder is in operative cutting position; and manually operable locking means enabling locking of said food holding member together with said pressing member in operative cutting position adjacent to said flat face of said body member, whenever desired.

5. In a food cutting utensil in combination a base; a body member mounted on said base and provided with a flat face and a slot in said face; a cutting blade mounted in said slot; a food holder for holding the food during cutting; first pivot means turnably securing said food holder to said body member so that said food holder is adapted to move to and fro in a turning plane being parallel to and at a slight distance from said flat face of said body member; a food holding member forming part of said food holder; second pivot means forming also part of said food holder and constructed and arranged so as to enable tilting of said food holding member about an axis being parallel to said turning plane of said food holder, thus enabling tilting of said food holding member away from said flat face of said body member; a pressing member forming also part of said food holder and arranged within said food holding member movably normal to said turning plane of said food holder when the same is in operative cutting position; spring means forming also part of said food holder and arranged between said food holding member and said pressing member tending to move the latter toward said flat face of said body member when said food holder is in operative cutting position; and manually releasable blocking means adapted to hold said pressing member moved away from said flat face of said body member against action of said spring means, whenever desired.

6. In a food cutting utensil in combination a base; a body member mounted on said base and provided with a flat face and a slot in said face; a cutting blade mounted in said slot; a food holder for holding the food during cutting; first pivot means turnably securing said food holder to said body member so that said food holder is adapted to move to and fro in a turning plane being parallel to and at a slight distance from said flat face of said body member; first spring means tending to turn said food holder about said first pivot means in one direction; a food holding member forming part of said food holder; second pivot means forming also part of said food holder and constructed and arranged so as to enable tilting of said food holding member about an axis being parallel to said turning plane of said food holder, thus enabling tilting of said food holding member away from said flat face of said body member; a pressing member forming also part of said food holder and arranged within said food holding member movably normal to said turning plane of said food holder when the same is in operative cutting position; second spring means forming also part of said food holder and arranged between said food holding member and said pressing member tending to move the latter toward said flat face of said body member when said food holder is in operative cutting position; and manually releasable blocking means adapted to hold said pressing member moved away from said flat face of said body member against action of said spring means, whenever desired.

7. In a food cutting utensil in combination a base; a body member mounted on said base and provided with a flat face and a slot in said face; a cutting blade mounted in said slot; a food holder for holding the food during cutting; first pivot means turnably securing said food holder to said body member so that said food holder is adapted to move to and fro in a turning plane being parallel to and at a slight distance from said flat face of said body member; a food holding member forming part of said food holder; second pivot means forming also part of said food holder and constructed and arranged so as to enable tilting of said food holding member about an axis being parallel to said turning plane of said food holder, thus enabling tilting of said food holding member away from said flat face of said body member; a pressing member forming also part of said food holder and arranged within said food holding member movably normal to said turning plane of said food holder when the same is in operative cutting position; spring means forming also part of said food holder and arranged between said food holding member and said pressing member tending to move the latter toward said flat face of said body member when said food holder is in operative cutting position; manually releasable blocking means adapted to hold said pressing member moved away from said flat face of said body member against action of said spring means; and manually operable locking means enabling locking of said food holding member together with said pressing member in operative cutting position adjacent to said flat face of said body member, whenever desired.

8. In a food cutting utensil in combination a base; a flat body member mounted on said base and provided with two flat faces and a slot; a cutting blade mounted in said slot; a turnable food holder for holding the food during cutting; first pivot means turnably securing said food holder to said body member so that said food holder is adapted to move to and fro in a turning plane being parallel to and at a slight distance from one of said flat faces of said body member; a food holding member forming part of said food holder; second pivot means forming also part of said food holder and constructed and arranged so as to enable tilting of said food holding member about an axis being parallel to said turning plane of said food holder, thus enabling tilting of said food holding member away from said flat body member; a tiltable receiving plate mounted adjacent to the other face of said flat body member in such a manner as to be adapted to receive the cut food; and motion transmitting means connecting said turnable food holder adjacent to one of said flat faces of said flat body member with said receiving plate adjacent to the other of said flat faces of said flat body member in such a manner as to be adapted to tilt said receiving plate towards said flat body member once each time said food holder is moved in said turning plane past said cutting blade.

9. In a food cutting utensil in combination a base; a vertical supporting plate mounted on said base and provided with a substantially vertical flat face and a slot in said face; a cutting blade mounted in said slot; a food holder for holding the food during cutting; first pivot means securing said food holder to said body member turnably about a horizontal axis so that said food holder is adapted to move to and fro in a vertical turning plane being parallel to and at a slight distance from said vertical flat face of said vertical supporting plate; first spring means tending to turn said food holder about said first pivot means in one direction; a food holding member forming part of said food holder; second pivot means forming also part of said food holder and constructed and arranged so as to enable tilting of said food holding member about an axis being located in a vertical plane being parallel to said vertical turning plane of said food holder, thus enabling tilting of the food holding member away from said vertical flat face of said vertical supporting plate; a pressing member forming also part of said food holder and arranged within said food holding member movably in horizontal direction when said food holder is in operative cutting position; second spring means also forming part of said food holder and arranged between said food holding member and said pressing member tending to move the latter toward said vertical flat face of said vertical supporting plate when said food holder is in operative cutting position; manually releasable blocking means adapted to hold said pressing member moved away from said vertical supporting plate against action of said second spring; manually operable locking means enabling locking of said food holding member together with said pressing member in operative cutting position adjacent to said vertical flat face of said vertical supporting plate; a receiving plate; third pivot means securing said receiving plate to said vertical supporting plate tiltably about a horizontal axis in such a manner as to be adapted to receive the food cut by said cutting blade; and a motion transmitting mechanism connecting said turnable food holder with said tiltable receiving plate in such a manner as to tilt said tiltable receiving plate against said cutting blade each time said turnable food holder is moved in its vertical turning plane past said vertical flat face of said vertical supporting plate and said cutting blade mounted in said slot in said plate.

KARL SCHATZ.

REFERENCES CITED

The following references are of record in the file of this patent:

UNITED STATES PATENTS

| Number | Name | Date |
| --- | --- | --- |
| 169,991 | Hauck | Nov. 16, 1875 |
| 210,032 | Heimlich | Nov. 19, 1878 |
| 404,883 | Arndt | June 11, 1889 |
| 492,814 | Laughlin | Mar. 7, 1893 |
| 1,082,918 | Tornsjo | Dec. 30, 1913 |
| 1,192,013 | Stiles | July 25, 1916 |
| 1,498,114 | Osborne | June 17, 1924 |
| 2,309,127 | Mahler | Jan. 26, 1943 |
| 1,947,153 | Dellinger | Feb. 13, 1934 |